United States Patent
VanDeusen et al.

(10) Patent No.: US 6,598,172 B1
(45) Date of Patent: Jul. 22, 2003

(54) SYSTEM AND METHOD FOR CLOCK SKEW COMPENSATION BETWEEN ENCODER AND DECODER CLOCKS BY CALCULATING DRIFT METRIC, AND USING IT TO MODIFY TIME-STAMPS OF DATA PACKETS

(75) Inventors: Mark P. VanDeusen, Chandler, AZ (US); Robert A. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/431,297

(22) Filed: Oct. 29, 1999

(51) Int. Cl.[7] .................................................. G06F 1/14
(52) U.S. Cl. ....................... 713/503; 713/503; 714/744; 370/389; 370/516; 370/912
(58) Field of Search .................................. 370/912, 516, 370/389; 714/744; 713/503

(56) References Cited

U.S. PATENT DOCUMENTS

| | | | | |
|---|---|---|---|---|
| 5,386,493 A | * | 1/1995 | Degen et al. ............... | 395/2.76 |
| 5,596,420 A | * | 1/1997 | Daum ........................ | 386/110 |
| 5,652,627 A | * | 7/1997 | Allen ......................... | 348/497 |
| 5,699,392 A | * | 12/1997 | Dokic ......................... | 375/376 |
| 5,875,354 A | * | 2/1999 | Charlton et al. ............. | 395/881 |
| 5,896,524 A | * | 4/1999 | Halstead, Jr. et al. ........ | 395/553 |
| 6,208,643 B1 | * | 3/2001 | Dieterich et al. ............ | 370/389 |
| 6,327,274 B1 | * | 12/2001 | Ravikanth .................... | 370/516 |
| 6,356,871 B1 | * | 3/2002 | Hemkumar et al. ......... | 704/500 |
| 2001/0043621 A1 | * | 11/2001 | Anderson et al. ........... | 370/516 |

OTHER PUBLICATIONS

Ronald E. Crochiere & Lawrence R. Rabiner, "Multirate Digital Signal Processing", (Alan V. Oppenheim, Series Editor) Prentice–Hall, Inc. Signal Processing Series, 1983.
"Information Technology—Generic Coding of Moving Pictures and Associated Audio: Systems, Recommendation H.222.0", ISO/IEC 13818–1, N0801 rev., Apr. 25, 1995.

* cited by examiner

Primary Examiner—Thomas Lee
Assistant Examiner—Nitin Patel
(74) Attorney, Agent, or Firm—Kenyon & Kenyon

(57) ABSTRACT

In a coordinated computer system for encoding, transmitting, and decoding a series of data packets such as audio and/or video data, there may be a skew between the clock used by an encoder and the clock used by a decoder. In a method and device for compensating for this clock skew, the decoder calculates a drift metric representing the clock skew and modifies the time stamps of the data packets based on the drift metric. The decoder also performs a sample rate conversion on the digital data, in order to compensate for the clock skew between the encoder and decoder.

21 Claims, 6 Drawing Sheets

SYSTEM AND METHOD FOR CLOCK SKEW COMPENSATION BETWEEN ENCODER AND DECODER CLOCKS BY CALCULATING DRIFT METRIC, AND USING IT TO MODIFY TIME-STAMPS OF DATA PACKETS

BACKGROUND OF THE INVENTION

The present invention pertains to a method and device for compensating for clock drift in a coordinated computer system. More specifically, a method and device are provided for adjusting the decoding rate of encoded digital data to compensate for a mismatch between the clock of the device that is providing the data and the clock of the device that is decoding and rendering the data in a digital data transmission system.

In systems where digital data is encoded by an encoder, transmitted in packets of digital data, and decoded by a receiver, the encoder may receive data that includes digital samples of analog signals. Each digital sample may be a specific size (for example, 16 bits). A sampling rate represents the number of samples taken per unit of time (e.g., seconds, milliseconds). The encoder groups the samples into packets for transmission to a decoder.

The encoder places time stamp data in headers of the packets. The time stamp data represents the value of the encoder clock at various intervals, so that the decoding and encoding can be synchronized. In hardware decoders (for example, set-top boxes) the clock values represented in the time stamps are used to synchronize the decoder clock with the clock used to encode the data. Different time stamps may be used, for example, to indicate presentation time (the time at which a packet should be rendered (played), decode time (the time at which a packet should be decoded), and the reference value of the encoder system clock (at the time the data packet is created)). These time stamps are known as presentation time stamps (PTS), decoding time stamps (DTS), and system clock references (SCR).

In hardware decoder systems, the SCRs are used to synthesize a clock for the decoder, as described in Generic Coding of Moving Pictures and Associated Audio: Systems, Recommendation H.222.0, ISO/IEC 13818-1, Apr. 25, 1995 ("MPEG 2 Specification"). Since the SCRs are the values of the encoder clock at various intervals, by adopting these values as the decoder clock, the encoder and decoder clocks are synchronized. This may be done, for example, with a phase lock loop. If the synthesized decoder clock and the encoder clock begin to become unsynchronized, the decoder clock is adjusted via the phase lock loop, which provides a negative feedback to the decoder clock. Since the decoder clock is a synthesized clock, and not simply a direct crystal clock input, it can be adjusted in this manner.

In systems that do not have a synthesized clock, however, this method of synchronization cannot be used. This may occur, for example, in a personal computer system employing an audio card to decode digital audio signals. Since many different components of personal computers may have their own clocks, there is no synthesized clock present in the system. Audio cards generally each contain their own crystal clocks, which cannot be adjusted to accomplish synchronization with another clock. Another method, for example a software method, is therefore needed to compensate for the fact that the encoder clock and the decoder clock in, for example, a personal computer system, may not be synchronized.

SUMMARY OF THE INVENTION

In one embodiment of the present invention, a method and device are provided for compensating for clock skew in a coordinated computer system adapted to transmit a series of digital data packets—each digital data packet including a digital data sample—from an encoder to a decoder, comprising calculating a drift metric to represent the clock skew between an encoder clock and a decoder clock; modifying a time stamp of a digital data packet based on the drift. metric; and performing a sample rate conversion to adjust the playback rate of digital data.

DETAILED DESCRIPTION

Figure 1:
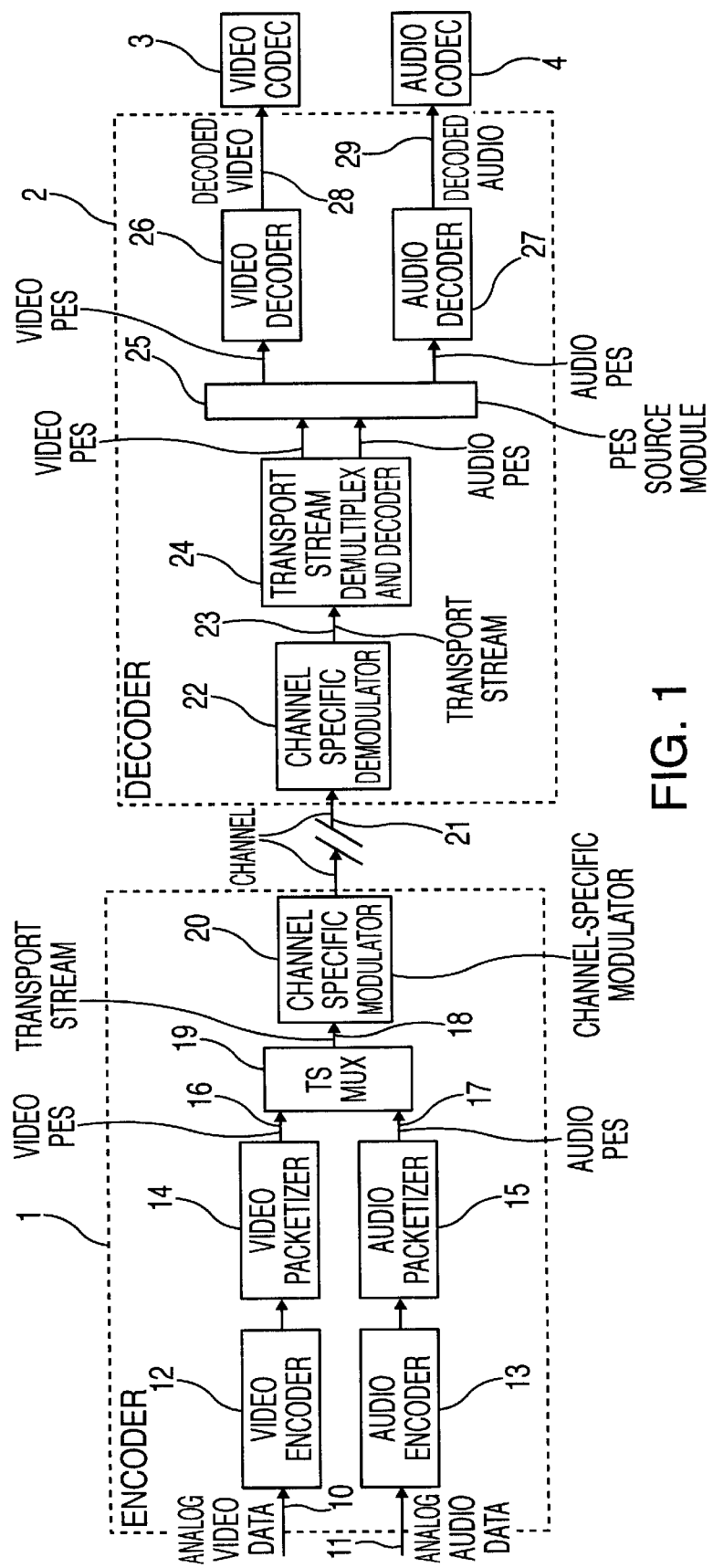
FIG. 1 is a block diagram of a system for encoding, transmitting, receiving, decoding, and playing digital audio and video data.

An embodiment of a system for encoding, transmitting, and decoding digital data is shown in FIG. 1. In the example of FIG. 1, the system encodes audio and video data and transmits the data (for example, via a network, such as the Internet or a cable network; or via a wireless system, such as a radio signal broadcast system). The operation of systems of the type shown in FIG. 1 is further described in the MPEG Specification.

The system shown in FIG. 1 includes an encoder 1 side and a decoder 2 side. The encoder 1 receives video 10 and audio 11 data (e.g., the analog audio and video output of a movie player). A video encoder 12 and an audio encoder 13 may each include a coder/decoder ("codec") and software for sampling the data to create digital audio and video data, according to standard analog to digital conversion techniques, for example, those used in pulse code modulation systems. The encoded digital data is then passed to audio 15 and video 14 packetizers (e.g., software modules) that prepare the data for transmission by dividing it into packets and inserting a packet header at the beginning of the packet. The information in the headers may include data indicating the beginning and length of a packet, time stamp data, and other data helpful to the decoder 2 side. The output of each packetizer is a packetized elementary stream (PES), that is, a stream of packetized digital data. The video PES 16 and audio PES 17 are each output to a transport stream multiplexer 19.

The transport stream multiplexer 19 combines programs with one or more independent time bases into a single stream. The transport stream is designed, for example, for use in environments where errors are likely, such as storage or transmission in lossy or noisy media. The transport stream is sent to a channel-specific modulator 20, which modulates data by converting it into a form that can be transmitted via a channel to a decoder (e.g., a carrier signal).

A channel of encoded digital data 21 is transmitted to the decoder side 2 (e.g., via a network, such as the Internet; a wireless system, such as a radio signal broadcast system; or a cable network). The channel 21 is input into a channel-specific demodulator 22, for example a hardware device or a software module, that decodes the channel 21 into a transport stream 23, as described in the MPEG Specification. A transport stream demultiplex and decoder 24 is, for example, a software module designed to decode the transport stream 23 into a video PES and an audio PES. The audio and video PESs 16, 17 are output to a PES source module 25, which adjusts the time stamps of the PESs 16, 17, according to the decoder's clock and outputs the video PES 16 to a video decoder 26 and the audio PES 17 to an audio decoder 27. The video and audio decoders 26, 27 may be, for example, software modules designed to decode the digital video and audio data, e.g., using codecs. In one embodiment of the present invention, the audio and video decoders 26, 27 are software objects designed in compliance with the Microsoft® Component Object Model (COM) framework. *See The Component Object Model Specification*, Draft Version 0.9, Oct. 24, 1995, Microsoft Corporation, Seattle, WA and Digital Equipment Corporation, Maynard, MA. The decoder modules 26, 27 decode and convert the digital data into decoded video 28 frames and decoded audio 29 samples that are output to components of the computer system for converting to playable analog signals (e.g., audio and video codecs 3,4) and playing them to a user (e.g., speakers, monitor—not shown). In an embodiment of the present invention, the PES source module 25 is effectively an "interrupt driven" module in that it is driven by the arrival of packets and requests from downstream components to be fed with more packets, rather than by any direct clock input. The PES source module 25 adjusts the time stamps of the audio data packets to compensate for any mismatch between the encoder clock and the decoder clock, as further explained below.

Figure 2:
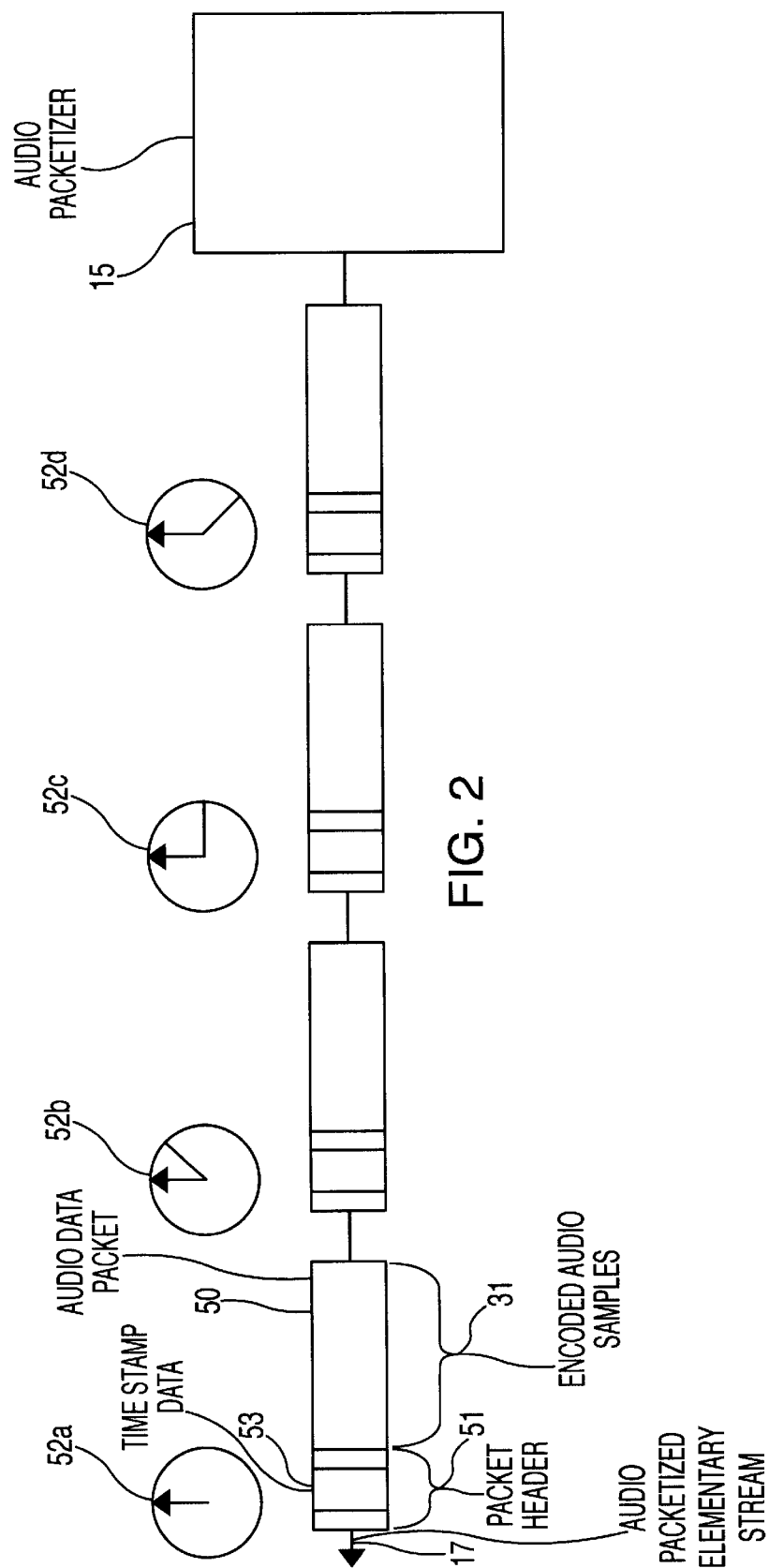
FIG. 2 is a schematic diagram of an audio packetized elementary stream.

FIG. 2 shows a schematic representation of encoded audio samples 31 comprising an audio packetized elementary stream 17, which may be created by the audio packetizer 15. The audio packetized elementary stream 17 is, for example, an isochronous data stream so that the data packets are delivered and played back within certain time constraints. The audio data packets 50 include encoded audio samples 31 and packet headers 51. The packet headers 51 include time stamp data 53, as well as other data that may, for example, indicate the packet length, the presence or absence of certain fields in the header, and the start of the encoded audio data. The "clock" shown as 52a–d represents the clock of the encoder 1. The time values of the clock 52 are shown schematically in FIG. 2 by the "hands" of the clock. The packetizer 15 groups audio data samples into packets 50 and inserts time stamp data ("time stamps") into the packet headers 51. The time stamps 53 include presentation time stamps (PTSs), which indicate the relative time at which the audio data packet 50 is to be played back at the audio codec 4. Taking the encoder clock 52 as an input, the packetizer 15 creates a PTS 53 for an audio data packet 50 by, for example, calculating a relative reference time, which measures the elapsed time since the beginning of the stream of audio data. Dividing the relative reference time by a playback rate, the packetizer 15 can determine the time at which the audio data packet should be presented for playback. This process is further described in the MPEG Specification.

Figure 3:
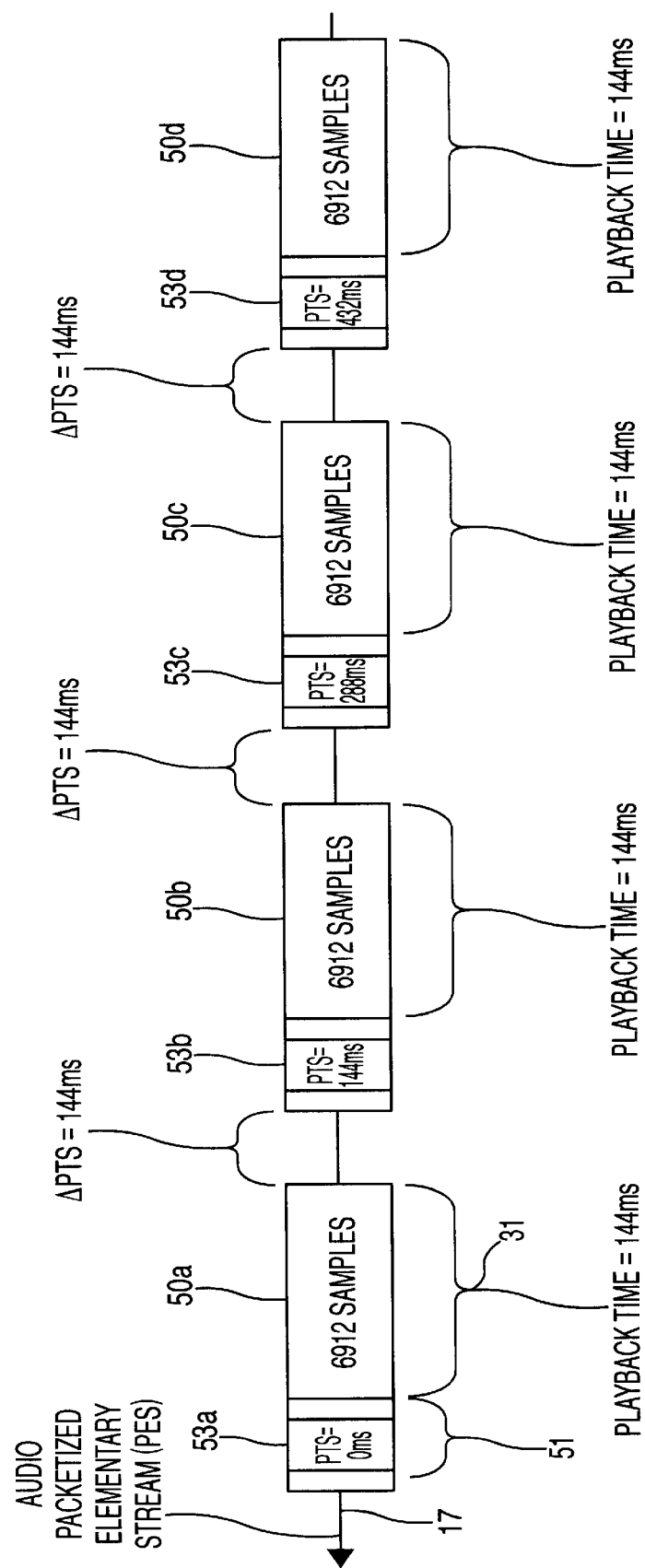
FIG. 3 is a schematic diagram of an example of an audio packetized elementary stream.

FIG. 3 shows a more detailed example of an audio PES 17 with examples of time stamp values and packet sizes shown in each packet 50a–d. Each PES audio data packet 50 contains a PTS and a data length in a packet header 51. After the data is decoded into samples (e.g., pulse code modulation samples), the difference between consecutive PTS 53 values will match the playback time of the decoded audio sample data between those consecutive PTS 53 values. For example, an audio decoder may decode each of the PES packets 50a–d into a group of N frames of 1152 samples each. The total number of decoded samples would then be N * 1152. In the audio data packets shown in FIG. 3, N=6, and there are 6*1152=6912 samples. At a playback sampling rate of, for example, 48,000 samples per second, it is expected that the 6912 audio samples will take 6912/48000=0.144s, or 144 ms to play. In the standard MPEG case, it is expected that the PTSs 53 attached to each PES packet 50 will reflect this time relationship. The difference between adjacent PTSs 53a–d is also expected to be 144 ms. This allows the audio to playback at exactly the expected rate (i.e., the rate set according to the encoder 1 clock). In addition to showing the playback times for the samples in each packet, FIG. 3 shows the PTS values 53 of each packet 50a–d in the packet headers 51 and the difference between each pair of consecutive PTSs 53 (ΔPTS). In each case shown in FIG. 3, the difference between the values of consecutive PTSs 53 equals the playback time of the samples 31 between the PTSs 53.

Figure 4:
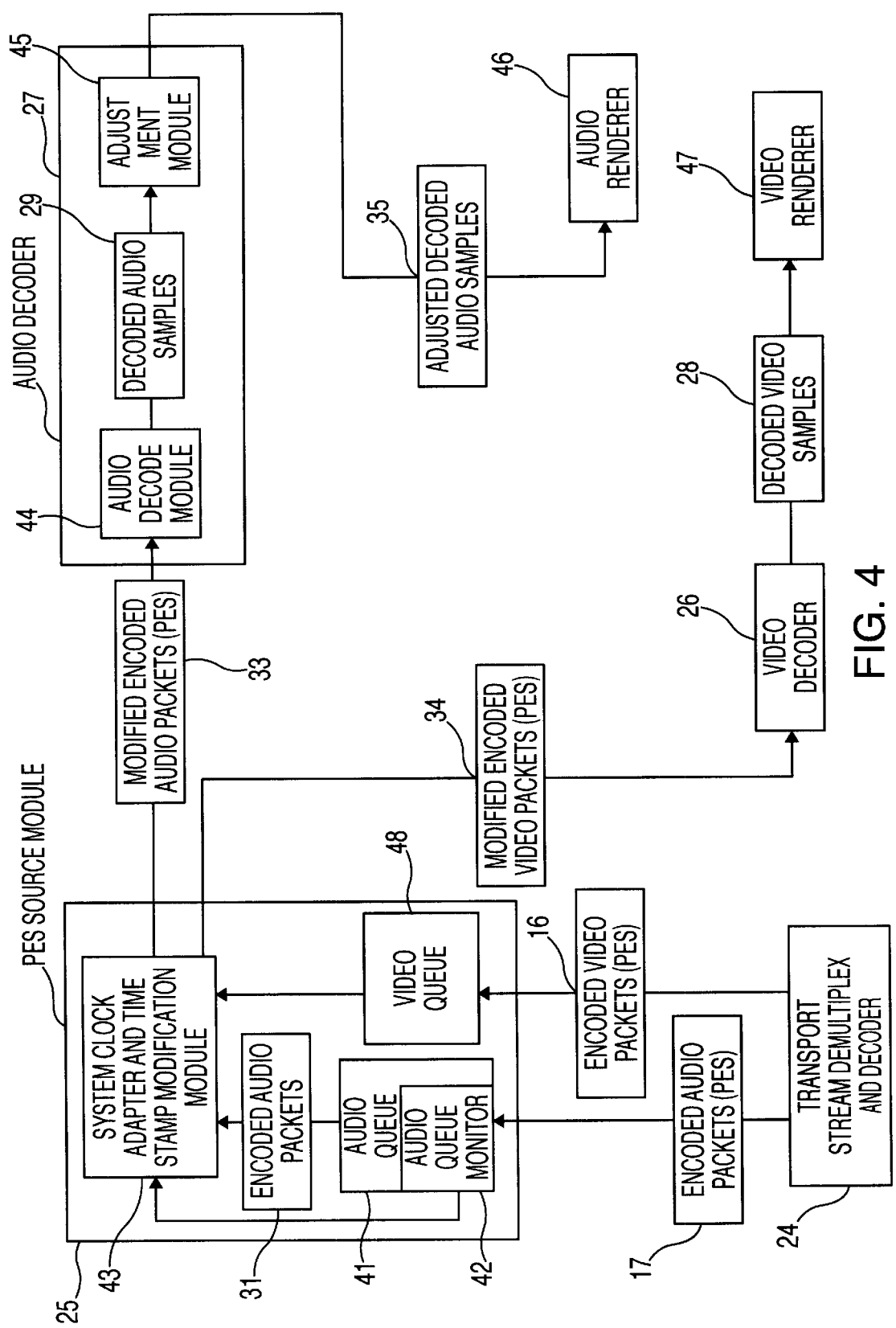
FIG. 4 is a block diagram of a system for decoding and playing digital audio and video data.

FIG. 4 shows a more detailed embodiment of the decoder portion of the digital audio/video system shown in FIG. 1. The transport stream demultiplex and decoder 24 outputs encoded audio packets (audio PES) 17 and encoded video packets (video PES) 16. The audio PES 17 (packets of audio data, including packet headers with time stamp data) and the video PES 16 are sent to a PES source module 25. The PES source module 25 includes software residing in memory as well as memory that is used to temporarily store data in a queue (e.g., memory buffers). The PES source module 25 includes an audio queue 41, a video queue 48, and a system clock adapter and time stamp modification module 43 ("TS modification module"). The audio queue 41 and video queue 48 include memory buffers that store packets of audio data to await decoding by the audio decoder 27 and the video decoder 26. The packets may be stored, for example, in the order received by the audio and video queues 41, 48.

The audio queue 41 also includes an audio queue monitor 42. The audio queue monitor 42 is, for example, a software module that monitors the length of the audio queue (e.g., the number of packets waiting to be sent to the audio decoder module 27). By determining whether the audio queue is growing or shrinking, the audio queue monitor can calculate a drift metric to determine a skew between the clock used in the encoding stage and the clock used by the decoder. Calculation of the drift metric is further described below.

The audio queue monitor 42 monitors the length of the queue of audio packets (i.e., the input/output of audio packets to/from the audio queue 41). The audio queue monitor 42 may calculate a drift metric by using the growth (or diminution) of the queue 41 to calculate the percent slower (or faster) than the expected playback rate the audio packets 50 are being rendered. An example will make this calculation clear. In this example, the clock skew (and therefore the drift metric) is exaggerated (compared to typical implementation values) to more easily demonstrate the method employed. Also for the sake of simplicity, in this example, all the audio data packets 50 are the same size (i.e., each has an equal number of samples, and each consists of an equal number of bits).

If 100 audio packets 50 are input to the audio queue 41, during a given time period, and during that same time period only 98 packets are output from the audio queue, then the length of the audio queue will increase by 2 packets, and a drift metric (D) may be calculated, for this given time period, as follows:

$$D = \frac{(\text{\# of packets arrived}) - (\text{queue growth})}{(\text{\# of packets arrived})}.$$

In this example, the drift metric would be $$.98 = \frac{100-2}{100}.$$

If the queue was diminished by 2 packets during the given time period, rather than growing by 2 packets, a drift metric could be calculated as follows:

$$1.02 = \frac{100-(-2)}{100}.$$

The drift metric calculated by the audio queue monitor is sent as an input to the TS modification module 43. When an encoded audio packet 50 reaches the head of the audio queue 41, it is sent (along with encoded video packets, if present) to the TS modification module 43. The TS modification module 43 is, for example, a software module residing in a memory. The TS modification module 43 receives as an input the drift metric calculated by the audio queue monitor 42. The TS modification module 43 modifies the time stamps of each encoded audio sample 31 and each encoded video sample 32, using the drift metric calculated by the audio queue monitor 42 as a scale factor. This modification is done in order to compensate for any differential ("clock drift"or "clock skew") between the encoding and decoding clocks. Both audio and video (when video is present) must be modified in this manner in order to maintain synchronization (commonly known as "lipsync").

The original time stamp 53 of each packet 50 can be multiplied by the drift metric to create a modified time stamp. Alternatively, in systems where the packets are of constant size/duration, a modified time stamp may be calculated by multiplying the constant duration of each packet by the drift metric and adding the result to the adjusted time stamp of the previous packet. This can be expressed as $T_{i+1,adj} = T_{i,adj} + (C_d)(D)$, where $T_{i,adj}$ and $T_{i+1,adj}$ are the adjusted time stamps for two consecutive packets in a sequence. Cd is the constant time duration of each packet, and D is the drift metric, as calculated above. Although in this particular embodiment a system with packets of constant size/duration is described, it is to be understood that the method described above for calculating an adjusted time stamp can also be modified to apply to a PES where the packets are not a constant size/duration.

Figure 5:
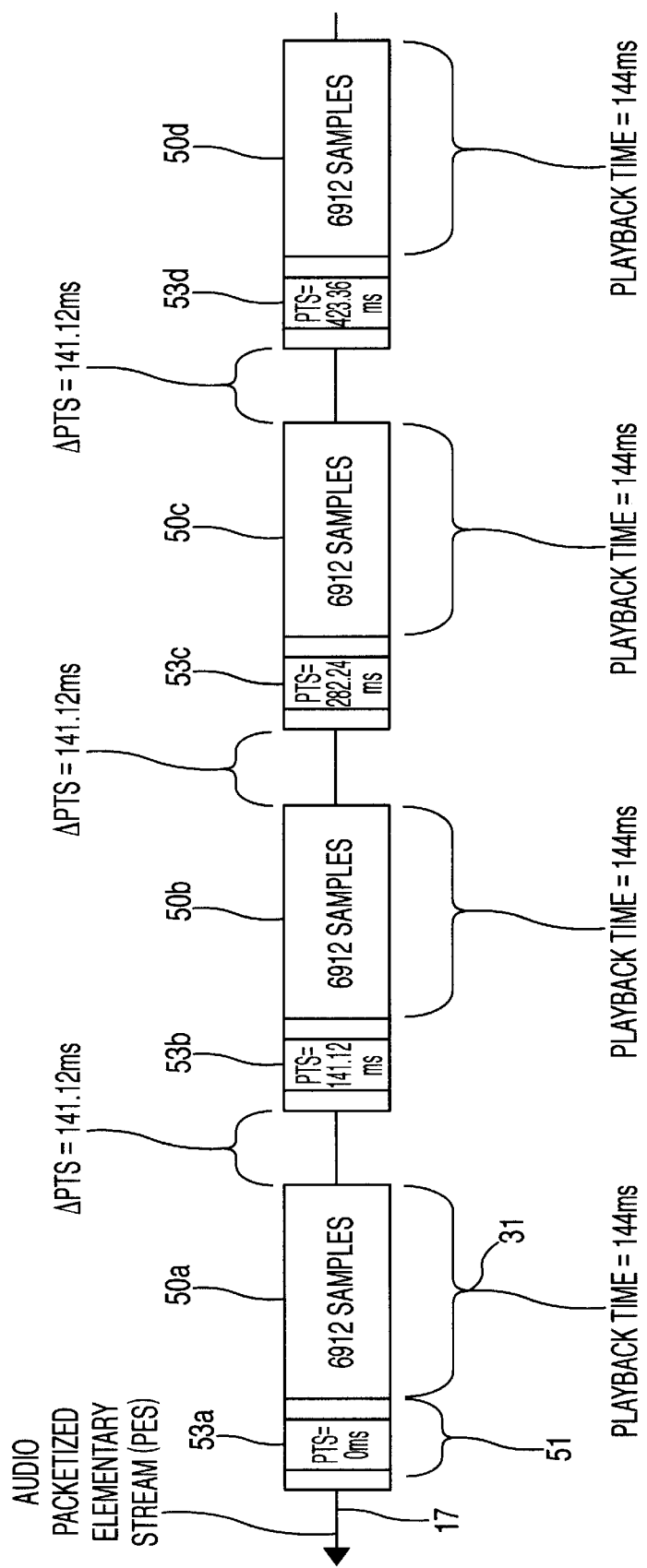
FIG. 5 is a a schematic diagram of an example of an audio packetized elementary stream with modified time stamps.

FIG. 5 shows schematically another example of an audio packetized elementary stream 17. In this case, the time stamps 53a–d of the packets 50a–d shown in FIG. 3 have been multiplied by a drift metric of 0.98, calculated, for example, as described above. The time stamp 53 of the data packet 50a has a value of 0 in this example so multiplication by the drift metric results in no change. The modified value of the time stamp 53b can be computed as the time stamp 53b value (144 ms) multiplied by the drift metric (0.98 in this example), for a modified time stamp 53b of 141.12 ms. In a similar manner, modified time stamp 53c is calculated to be 282.24, and modified time stamp 53c is calculated to be 423.36.

Referring again to FIG. 4, once the TS modification module 43 has modified the time stamps 53 of the encoded data packets 17, the modified encoded data packets 33 are sent to the audio decoder 27. The modified encoded audio packets 33 have time stamps 53 that do not necessarily match the playback time of the audio samples any more. The audio decoder 27, therefore, recovers the drift metric used to modify the time stamps 53 and uses it to perform a sample rate conversion to adjust the playback time of the audio data packet 50 to correspond to the time represented by the modified time stamps 53. Since the audio decoder can calculate the playback time of a PES Packet and it can calculate the ΔPTS between adjacent packets, it can recover the scale factor (drift metric) that the PES source module 25 applied to the PTS 53 values.

The modified PTSs 53 of each audio data packet 50 in the modified audio PES 33 indicate at what relative time each packet should be presented. Other data included in the packet header 51 indicates the length of the packet. Based on the modified time stamp information of two sequential packets, the audio decoder 27 can determine at what time it is instructed to present the packets (by looking at the modified PTS 53 of each packet). By dividing the length of a packet (number of samples) by the nominal sampling rate (e.g., the rate used by the encoder to create the samples), the audio decoder 27 can determine the time it will actually take to play each packet at the nominal sampling rate. By comparing these times, the audio decoder 27 can determine the drift metric used to modify the time stamps 53 of the audio packets 50.

This calculation can be represented in an equation as $$D = \frac{PTS_2 - PTS_1}{L_1},$$

where $PTS_2$ is the value of a presentation time stamp 53b of the second (later) audio data packet 50b in the sequence, $PTS_1$, is the presentation time stamp 50a of the first (earlier) audio data packet 50a. $L_1$ is the playback time of the first audio data packet 50a at the nominal sampling rate. By subtracting the presentation time of the first packet 50a from the presentation time of the second packet 50b, the audio decoder 27 determines the amount of time the first packet 50a is to be played in, according to the decoder clock. By dividing the length of the first audio packet (e.g., the number of samples, where each sample comprises a specific, predetermined number of bytes) by the nominal playback rate (e.g., number of bytes per second), the audio decoder 27 can determine the playback time of the first audio packet ($L_1$ = (number of samples)/(nominal playback rate)). The ratio between the amount of time the first packet is to be played in (according to the modified time stamps) and the playback time of the first audio packet, is the drift metric used to modify the time stamps. In one embodiment of the invention, a drift metric is calculated for each individual packet, and is used to modify the time stamp of that packet. In this case, the drift metric is recovered for each individual packet, as described above.

Referring again to FIG. 5, there is a stream of four PES Packets 50 received at the audio decoder 27. In this example, a linear scale factor (drift metric) of 0.98 has been applied to the PTS values 53. The amount of data contained in each packet however, remains a constant. Using a scale factor (drift metric) less than 1.0 will cause the audio to play faster, a scale factor greater than 1.0 will cause the data (e.g., audio) to play slower. The playback time of each packet 50 no longer matches the difference between adjacent PTS 53 values. For example, at a playback rate of 48,000 samples per second, the playback time of each packet 53 is 6912/48000=0.144s=144 ms. The ΔPTS between packets 50, however, is 141.12 ms. The audio decoder 27 calculates the linear scale factor (drift metric) on a per PES Packet 50 basis by dividing the ΔPTS by the playback time of each PES Packet. In this example, the scale factor is 141.12/144=0.98. Since the drift metric may change instantaneously, a new drift metric may be calculated for each packet.

Returning to FIG. 4, the audio decoder 27 includes an audio decode module 44 and an adjustment module 45. The audio decode module 44 may include a hardware coder/decoder ("codec"), or it may comprise a decoder implemented solely in software. In either case, the audio decode module 44 may include a software module residing in memory to decode the modified encoded audio packets 33 into samples. The modified packets 33 may be decoded, for example, according to a standard decode algorithm such as the one described in the MPEG Specification to produce decoded audio samples 29.

The decoded audio samples 29 are sent to an adjustment module 45. The adjustment module 45 includes software stored in memory that adjusts the decoded audio samples 29, to compensate for clock skew by performing a sample rate conversion based on the linear scale factor (drift metric). The new sampling rate for audio playback will be the nominal sampling rate multiplied by the linear scale factor. Continuing with the above example of a linear scale factor of 0.98 and a nominal sampling rate of 48,000 samples per second, the new sampling rate would be 0.98*48,000=47,040 samples per second. Converting a stream of audio samples created at 48,000 to 47,040 and playing them back on a device (e.g., an audio codec) being clocked at 48,000 samples per second will cause the audio to playback at 1/0.98=1.02041 or 2.041% faster than normal.

The sampling rate conversion may be performed, for example, by known methods for sampling rate conversions. See Lawrence R. Rabiner, and Ronald E. Crochiere, *Multirate Digital Signal Processing*; Prentice Hall, March 1983. Sampling rate conversion is the process of converting a discrete signal sampled at one sampling rate to a similar signal sampled at a different sampling rate. Both the original discrete signal and the re-sampled signal are represented by a set of discrete samples. For each time period of the signal, there are a certain number of samples representing it. The number of samples per unit of time is the sampling rate, so to convert to a different sampling rate, samples may be added or subtracted. For example, to add samples, a certain number of existing samples (e.g., every tenth sample) can be replicated and added to a stream of samples. Alternatively, a certain value (e.g., a zero (0)) may be inserted after each value of the original signal to get a re-sampled signal that is twice as long. In a similar manner, samples may also be deleted to shorten a stream of samples and convert to a lower sampling rate. For example, to cut a sampling rate by half, every other sample may be deleted.

In all of the techniques discussed above (i.e., replication, zero insertion, and deletion) the adjustment module 45 is adding aliasing distortion to the frequency content of the re-sampled signal. If the aliasing distortion is audible or fails to meet audio quality specifications, the distortion may be filtered out by using a low-pass anti-aliasing filter. In addition to the examples of sampling rate conversion described above for illustration, other methods, including more sophisticated techniques, for example including anti-alias low-pass filtering to maintain high signal quality or using polynomial interpolation to perform the sampling rate conversion could also be used.

After the adjustment module 45 has performed a sample rate conversion, as described above, it outputs adjusted decoded audio samples 35 to an audio renderer 46. The audio renderer 46 includes, for example, a codec to convert the digital data samples to a signal that can be output to a user. The audio renderer 46 may receive as an input a signal from a hardware crystal clock provided for the audio/video decode and playback system (the decoder clock).

In systems employing both audio and video, modified encoded video samples 34 are also output by the TS modification module 43. These modified samples 34 are sent to a video decoder module 26. The video decoder module 26 outputs decoded video samples 28 to a video renderer 47, which converts the video samples to video signals (or pixel values) that are capable of being displayed to a user (e.g., via a cathode ray tube or liquid crystal display computer monitor). In one embodiment of the invention, the video samples are automatically synched to the audio samples using any of several known techniques for speeding or slowing video to match audio. In this manner, the video PES is slaved to the audio PES, and the sample rate conversion performed on the audio therefore also adjusts the playback rate of the video.

Figure 6:
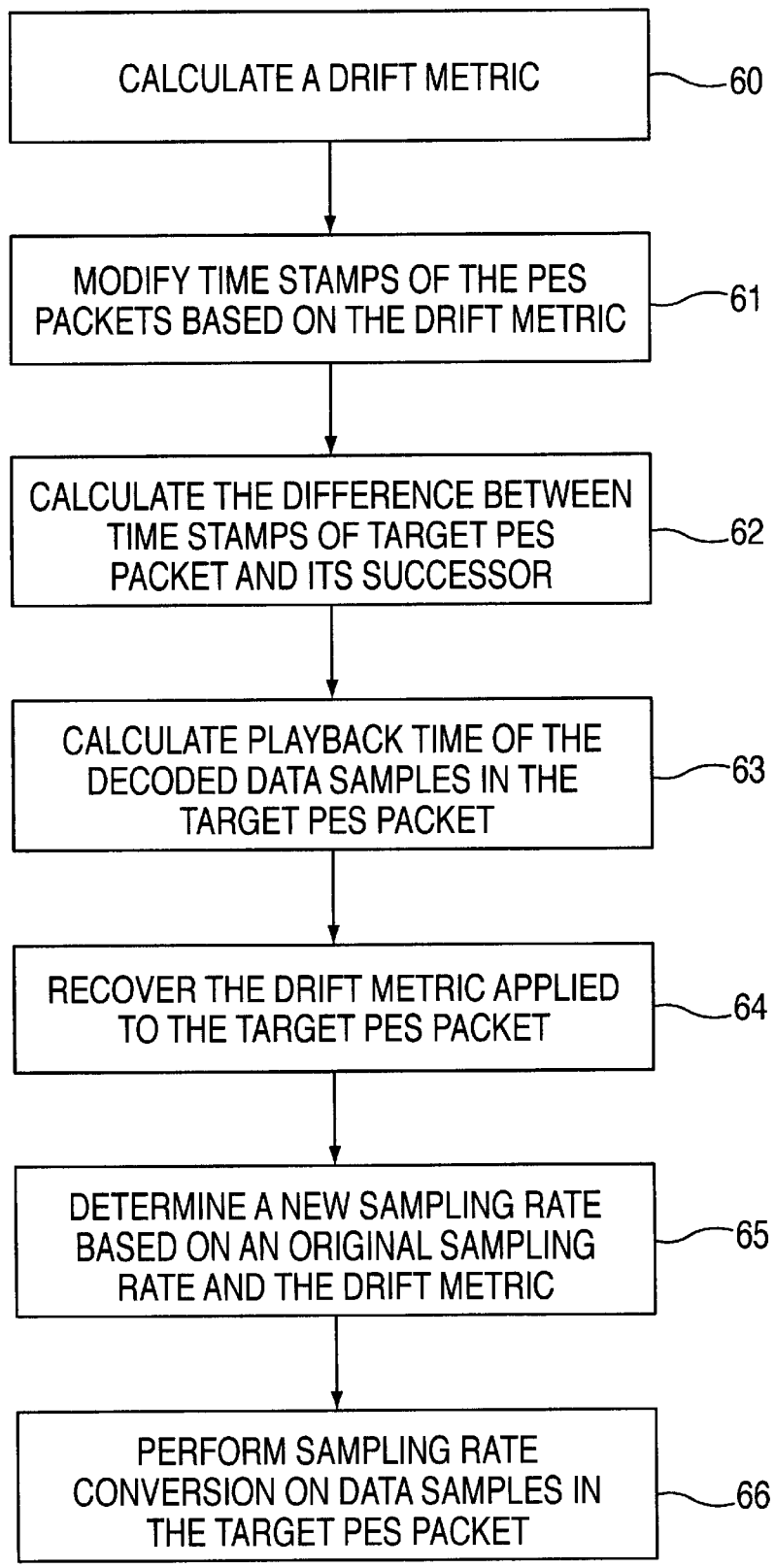
FIG. 6 is a flow diagram of a method according to an embodiment of the invention.

FIG. 6 shows a general flow chart of a method for compensating for a clock drift, according to an embodiment of the invention. This method may be implemented, for example, by a system such as shown in FIGS. 1 and 4. As described above, in step 60, a drift metric is calculated to estimate the skew between the encoder and decoder clocks. In step 61, the packets 50 of the PES 17 have their time stamps 53 modified based on the drift metric, as described above. In step 62, the difference between the time stamps of a target PES packet and its successor is calculated to determine a ΔPTS value. In step 63, the playback time of the decoded data samples in the target PES packet is calculated, as described above. In step 64, the drift metric that was applied to modify the time stamp of the target PES packet in step 61 is recovered, as described above. In step 65, a new sampling rate based on the original sampling rate and the drift metric is calculated, as described above. In step 66, a sampling rate conversion on the data samples in the target PES packet is performed, as described above.

Although an embodiment is specifically illustrated and described herein, it will be appreciated that modifications and variations of the present invention are covered by the above teachings and within the purview of the appended claims without departing from the spirit and intended scope of the invention. It is to be understood, for example, that although the example of a system employing both audio and video is given, the invention could apply equally to systems employing a stream of isochronously encoded digital data, regardless of type (e.g., audio, video, text). In the preferred embodiment, audio provides the isochronous stream. For example, the components described in one embodiment as adapted to process audio data (e.g., the audio decoder 27) may be adapted to process other types of data using the same or similar techniques. The invention may be applied to multiple synchronized data streams where non-isochronous data streams are synchronized to an isochronous data stream, or adapted to apply to non-isochronous data. Furthermore, it is to be understood that certain components of the invention described above as being implemented in hardware may also be implemented using software or a combination of hardware and software, with in the scope of the invention. Similarly, certain components described as being implemented in software may also be implemented using hardware or a combination of hardware and software. Although for the sake of simplicity and ease of understanding, particular numerical examples were used above, in actual systems, the clock rate mismatch between the encoder and decoder is more likely to be on the order of parts per 1000. This case would yield very small linear scale factors (drift metrics) of between 0.999 and 1.001, and for a nominal sampling rate at 48000, converted sample rates that may only vary from approximately 47952 to approximately 48048.

What is claimed is:

1. A method for compensating for clock skew in a coordinated computer system adapted to transmit a series of digital data packets, each digital data packet including a digital data sample, from an encoder to a decoder, comprising:

calculating a drift metric, based on a plurality of received digital data packets, to represent the clock skew between an encoder clock and a decoder clock;

modifying a time stamp of a digital data packet based on the drift metric; and performing a sample rate conversion to adjust the playback rate of digital data.

2. The method of claim 1, the calculating of a drift metric including monitoring a queue of digital data packets.

3. The method of claim 1, further comprising:

recovering the drift metric used to modify the time stamp by calculating a difference between a time stamp of a first digital data packet and a time stamp of a second digital data packet, and dividing said difference by a playback time of the first digital data packet.

4. The method of claim 1, the performing of a sample rate conversion to adjust the playback rate of the digital data including selectively replicating a digital data sample and adding the replicated digital data sample to the digital data, if the drift metric indicates that the encoder clock is slower than the decoder clock.

5. The method of claim 1, the performing of a sample rate conversion to adjust the playback rate of the digital data including selectively deleting a digital data sample from the digital data, if the drift metric indicates that the encoder clock is faster than the decoder clock.

6. The method of claim 1, the series of digital data packets including digital audio data samples.

7. The method of claim 6, the series of digital data packets including digital video data samples.

8. The method of claim 1, the digital data transmission system adapted to comply with the MPEG Specification.

9. A computer system adapted to receive and decode a series of digital data packets from an encoder having an encoder clock, comprising:

a decoder clock;

a queue monitor, adapted to calculate a drift metric based on a plurality of received digital data packets;

a time stamp modification module, adapted to modify a time stamp of a digital data packet based on the drift metric;

an adjustment module, adapted to perform a sample rate conversion on a series of digital data samples, based on the drift metric.

10. The computer system of claim 9, the adjustment module adapted to perform the sample rate conversion by selectively replicating a digital data sample and adding the replicated digital data sample to the series of digital data samples, if the encoder clock is slower than the decoder clock.

11. The computer system of claim 9, the adjustment module adapted to perform the sample rate conversion by selectively deleting a digital data sample from the series of digital data samples, if the drift metric indicates that the encoder clock is faster than the decoder clock.

12. The computer system of claim 9, the series of digital data packets including digital audio data samples.

13. The computer system of claim 9, the series of digital data packets including digital video data samples.

14. The computer system of claim 9, the digital data transmission system adapted to comply with the MPEG Specification.

15. The computer system of claim 9, further comprising:

an audio decode module adapted to recover the drift metric used to modify the time stamp by calculating a difference between a time stamp of a first digital data packet and a time stamp of a second digital data packet, and dividing said difference by a playback time of the first digital data packet.

16. An article comprising a storage medium including a set of instructions, said set of instructions capable of being executed by a processor to implement a method for compensating for clock skew in a coordinated computer system adapted to transmit a series of digital data packets from an encoder to a decoder, the method comprising:

calculating a drift metric, based on a plurality of received digital data packets, to represent the clock skew between an encoder clock and a decoder clock;

modifying a time stamp of a digital data packet, based on the drift metric; and performing a sample rate conversion to adjust the playback rate of digital data.

17. The article of claim 16, the method further including:

selectively replicating a digital data sample and adding the replicated digital data sample to the digital data, if the drift metric indicates that the encoder clock is slower than the decoder clock.

18. The article of claim 16, the method further including:

selectively deleting a digital data sample from the digital data, if the drift metric indicates that the encoder clock is faster than the decoder clock.

19. The article of claim 16, the series of digital data packets including digital audio data.

20. The article of claim 16, the series of digital data packets including digital video data.

21. The article of claim 16, the digital of transmission system adapted to comply with the MPEG Specification.

* * * * *

UNITED STATES PATENT AND TRADEMARK OFFICE
CERTIFICATE OF CORRECTION

PATENT NO. : 6,598,172 B1
APPLICATION NO. : 09/431297
DATED : July 22, 2003
INVENTOR(S) : VanDeusen et al.

It is certified that error appears in the above-identified patent and that said Letters Patent is hereby corrected as shown below:

In column 10, line 55, in Claim 21, after "digital" delete "of" and insert -- data --, therefor.

Signed and Sealed this

Fifth Day of February, 2008

JON W. DUDAS
*Director of the United States Patent and Trademark Office*